US012180058B2

(12) United States Patent
Gomi

(10) Patent No.: US 12,180,058 B2
(45) Date of Patent: Dec. 31, 2024

(54) EXTRACTION VALVE

(71) Applicant: NITTOKU CO., LTD., Kodaira (JP)

(72) Inventor: Hisaaki Gomi, Kodaira (JP)

(73) Assignee: NITTOKU CO., LTD., Kodaira (JP)

( * ) Notice: Subject to any disclaimer, the term of this patent is extended or adjusted under 35 U.S.C. 154(b) by 83 days.

(21) Appl. No.: 17/998,429

(22) PCT Filed: May 15, 2020

(86) PCT No.: PCT/JP2020/019434

§ 371 (c)(1),
(2) Date: Nov. 10, 2022

(87) PCT Pub. No.: WO2021/229793

PCT Pub. Date: Nov. 18, 2021

(65) Prior Publication Data

US 2024/0002213 A1 Jan. 4, 2024

(51) Int. Cl.
*B67D 1/00* (2006.01)
*B67D 1/14* (2006.01)

(52) U.S. Cl.
CPC ......... *B67D 1/1466* (2013.01); *B67D 1/0051* (2013.01)

(58) Field of Classification Search
CPC .. B67D 1/1466; B67D 1/0051; B67D 1/0021; B67D 3/043; B67D 1/1277; B67D 1/145; F16K 31/52408; F16K 31/52416
See application file for complete search history.

(56) References Cited

U.S. PATENT DOCUMENTS

2013/0256343 A1 10/2013 Minica
2019/0112176 A1 4/2019 Sevcik

FOREIGN PATENT DOCUMENTS

EP 1669322 6/2006
JP 2018-20804 A 2/2018
JP 2019-209988 A 12/2019
WO WO-2018084736 A1 * 5/2018 ........... B67D 1/0081

OTHER PUBLICATIONS

The extended European search report of the corresponding EP application No. 20935253.3 mailed Mar. 12, 2024.

* cited by examiner

*Primary Examiner* — Marina A Tietjen
(74) *Attorney, Agent, or Firm* — Muncy, Geissler, Olds & Lowe, P.C.

(57) ABSTRACT

Extraction valve 100 includes main body section 10, first inflow port portion 11*a*, second inflow port portion 12*a*, extraction section 12, first flow path 11*b*, second flow path 12*b*, first valve body 13 and second valve body 14, push-in bar 15, and cock 18 connected to an end of push-in bar 15 and used to rotate push-in bar 15. One or both of first valve body 13 and second valve body 14 are moved back and forth on the basis of the rotation of push-in bar 15, and first flow path 11*b* is opened and closed by the back-and-forth movement of first valve body 13 and second flow path 12*b* is opened and closed by the back-and-forth movement of second valve body 14.

15 Claims, 9 Drawing Sheets

EXTRACTION VALVE

TECHNICAL FIELD

The present invention relates to an extraction valve, and more specifically to an extraction valve into which a first beverage and a second beverage are respectively allowed to independently flow and which enables the first beverage, the second beverage, or the first beverage and the second beverage to be selectively extracted from one extraction section.

BACKGROUND ART

In a restaurant or the like, an extraction valve for extracting from a beverage stored in large amounts an appropriate amount of the beverage has been used.

In the extraction valve, not only allowing one type of beverage to flow thereinto and extracting the beverage in a timely manner but also respectively allowing an undiluted solution and a diluted solution such as water or a foamed solution to independently flow thereinto and extracting them in a timely manner, for example, has been performed.

Known as an example of the extraction valve is a beverage extraction valve including a valve main body, a dilution water flow path connected to the valve main body and supplying dilution water to the valve main body, a beverage undiluted solution flow path connected to the valve main body and supplying a beverage undiluted solution to the valve main body, a dilution water supply valve provided in the dilution water flow path, a beverage undiluted solution supply valve provided in the beverage undiluted solution flow path, and an operation lever provided in an upper part of the valve main body, and being openable and closable by moving the operation lever in a slide hole and selectively pressing either one or both of the dilution water supply valve and the beverage undiluted solution supply valve in a predetermined pressing direction depending on its position (see, e.g., Patent Literature 1).

In the above-described beverage extraction valve, the operation lever is provided in the slide hole in the upper part of the valve main body. Accordingly, contaminants such as dust and droplets of a beverage may enter the operation lever from the slide hole and adhere thereto. Accordingly, the contaminants may prevent the operation lever from moving and thus cause a failure of the beverage extraction valve.

On the other hand, there has been known a liquid extraction device including an extraction section having a foamed solution flow path through which a foamed solution flows and an undiluted solution flow path through which an undiluted solution flows formed therein and an extraction nozzle section having a foamed solution extraction port portion communicating with the foamed solution flow path and for extracting the foamed solution and an undiluted solution extraction port portion communicating with the undiluted solution flow path and for extracting the undiluted solution, and being adapted such that the foamed solution flow path and the undiluted solution flow path are respectively provided with open/close valves and the open/close valves are opened and closed in synchronization with an operation of a cock provided beside the extraction section (see, i.e., Patent Literature 2). According to the liquid extraction device, the cock is provided beside the extraction section, thereby making it possible to prevent contaminants from entering the extraction section.

CITATION LIST

Patent Literature

PTL 1: Japanese Patent Application Laid-Open No. 2018-20804

PTL 2: Japanese Patent Application Laid-Open No. 2019-209988

SUMMARY OF INVENTION

Technical Problem

In the conventional extraction valve including the beverage extraction valve described in Patent Literature 1, its internal structure varies. However, the extraction valve generally has a disadvantage of being difficult to repair and maintain because it has a large number of components and has a complicated internal structure.

The present invention has been made in view of the above-described circumstances, and is directed to providing an extraction valve capable of preventing entrance of contaminants and enabling a first beverage, a second beverage, or the first beverage and the second beverage to be selectively extracted even with a simple internal structure.

Solution to Problems

The inventors of the present invention have intensively studied to solve the above-described problem and found that the above-described problem can be solved by connecting a cock for rotating a push-in bar inserted into a main body section to an exposed end of the push-in bar and moving one or both of a first valve body and a second valve body contained in the main body section back and forth on the basis of the rotation of the push-in bar, thereby completing the present invention.

The present invention resides in (1) an extraction valve into which a first beverage and a second beverage are respectively allowed to independently flow and which enables the first beverage, the second beverage, and the first beverage and the second beverage to be selectively extracted from one extraction section, the extraction valve including a main body section having a cylindrical trapezoidal shape, a first inflow port portion and a second inflow port portion provided in a back portion of the main body section, the extraction section provided on a side surface of the main body section, a first flow path provided in the main body section and connecting the first inflow port portion and the extraction section to each other, a second flow path provided in the main body section and connecting the second inflow port portion and the extraction section to each other, a first valve body contained in the main body section and including the first valve portion inserted into the first flow path and a first support portion supporting the first valve portion, a second valve body contained in the main body section and including a second valve portion inserted into the second flow path and a second support portion supporting the second valve portion, a push-in bar which is inserted into the main body section and with which the first valve body and the second valve body are brought into contact, and a cock connected to an end, which is exposed from the main body section, of the push-in bar and used to rotate the push-in bar, in which one or both of the first valve body and the second valve body are moved back and forth on the basis of the rotation of the push-in bar, and the first flow path is opened and closed by the back-and-forth movement of the first valve body and the second flow path is opened and closed by the back-and-forth movement of the second valve body.

The present invention resides in (2) the extraction valve described in the foregoing item (1), in which the push-in bar is slidable to be located at a first position, a second position, and a third position in an axial direction of the push-in bar, only the first valve body moves back and forth when the push-in bar is rotated using the cock if the push-in bar is located at the first position, only the second valve body moves back and forth when the push-in bar is rotated using the cock if the push-in bar is located at the second position, and both the first valve body and the second valve body move back and forth when the push-in bar is rotated using the cock if the push-in bar is located at the third position.

The present invention resides in (3) the extraction valve described in the foregoing item (2), in which the push-in bar is movable between the first position and the second position, and a position on one side is the first position, a position on the other side is the second position, and a position between the first position and the second position is the third position.

The present invention resides in (4) the extraction valve described in the foregoing item (2) or (3), in which the push-in bar includes a quarter-semicylindrical portion at its center, semicylindrical portions respectively provided to be continuous to both sides of the quarter-semicylindrical portion, and cylindrical portions respectively provided to be continuous to the semicylindrical portions, an end of the first support portion on the opposite side to the first valve portion is brought into contact with the semicylindrical portion and an end of the second support portion on the opposite side to the second valve portion is brought into contact with the quarter-semicylindrical portion at the first position, an end of the first support portion on the opposite side to the first valve portion is brought into contact with the quarter-semicylindrical portion and an end of the second support portion on the opposite side to the second valve portion is brought into contact with the semicylindrical portion at the second position, and an end of the first support portion on the opposite side to the first valve portion and an end of the second support portion on the opposite side to the second valve portion are brought into contact with the semicylindrical portion at the third position.

The present invention resides in (5) the extraction valve described in any one of the foregoing items (1) to (4), in which the first support portion and the second support portion each have a stick shape, and their respective axial directions are parallel to each other.

The present invention resides in (6) the extraction valve described in any one of the foregoing items (1) to (5), in which the first valve body further includes a first head portion provided on the opposite side to the first valve portion with respect to the first support portion, the second valve body further includes a second head portion provided on the opposite side to the second valve portion with respect to the second support portion, a first spring body sandwiched between the first head portion and a first receiving stand formed in the main body section is attached to the first valve body, and a second spring body sandwiched between the second head portion and a second receiving stand formed in the main body section is attached to the second valve body.

The present invention resides in (7) the extraction valve described in any one of the foregoing items (1) to (6), in which the first valve body further includes a first head portion provided on the opposite side to the first valve portion with respect to the first support portion and a first cover portion covering the first head portion, the second valve body further includes a second head portion provided on the opposite side to the second valve portion with respect to the second support portion and a second cover portion covering the second head portion, the first cover portion is detachably attached to the first head portion, the second cover portion is detachably attached to the second head portion, and the first cover portion and the second cover portion are brought into contact with the push-in bar.

The present invention resides in (8) the extraction valve described in any one of the foregoing items (1) to (7), in which the first beverage is an undiluted solution, and the second beverage is a foamed solution, the extraction section includes a pipe section having a cylindrical shape contained in the main body section, a flow rate adjuster arranged inside the pipe section, an acceptor attached to a lower end of the flow rate adjuster, a spacer having a cylindrical shape attached to the main body section and arranged to surround the flow rate adjuster and the acceptor, and a nozzle section having a cylindrical shape attached to the main body section and arranged outside the spacer, the first beverage flows between the spacer and the nozzle section and is extracted, and the second beverage flows between the flow rate adjuster and the pipe and is guided to the acceptor and extracted from inside the spacer.

Advantageous Effects of Invention

In the extraction valve according to the present invention, the push-in bar is rotated using the cock, whereby one or both of the first valve body and the second valve body are selectively moved back and forth. This makes it possible to selectively extract the first beverage, the second beverage, or the first beverage and the second beverage.

In the extraction valve, the cock for rotating the push-in bar inserted into the main body section is connected to the exposed end of the push-in bar, thereby preventing contaminants such as dust and droplets of a beverage from entering the main body section. As a result, a failure caused by the contaminants can be prevented from occurring.

The above-described extraction valve has a simple internal structure in which the first valve body, the second valve body, and the push-in bar are attached to the inside of the main body section provided with the two flow paths and the like. Accordingly, the extraction valve has a relatively small number of components, and is significantly easy to repair and maintain.

In the extraction valve according to the present invention, the valve body to be moved back and forth is merely made switchable depending on the position of the push-in bar (the first position, the second position, and the third position), thereby making it possible to selectively extract the first beverage, the second beverage, and the first beverage and the second beverage in a simple operation of pushing and pulling the push-in bar in its axial direction to change the position. At this time, the push-in bar is made movable between the first position and the second position, whereby a position moved to its one end, a position moved to the other end, and an intermediate position therebetween can be respectively set as the first position, the second position, and the third position. Then, the first position, the second position, and the third position can be clearly distinguished, thereby making it difficult for a malfunction to occur.

In the extraction valve according to the present invention, the push-in bar includes the quarter-semicylindrical portion, the semicylindrical portions, and the cylindrical portions, for example, thereby making it possible to selectively extract the first beverage, the second beverage, and the first beverage and the second beverage depending on the position of the push-in bar.

That is, an end of the first support portion on the opposite side to the first valve portion is brought into contact with the semicylindrical portion and an end of the second support portion on the opposite side to the second valve portion is brought into contact with the quarter-semicylindrical portion at the first position, an end of the first support portion on the opposite side to the first valve portion is brought into contact with the quarter-semicylindrical portion and an end of the second support portion on the opposite side to the second valve portion is brought into contact with the semicylindrical portion at the second position, and an end of the first support portion on the opposite side to the first valve portion and an end of the second support portion on the opposite side to the second valve portion are brought into contact with the semicylindrical portion at the third position.

In the extraction valve according to the present invention, the first support portion and the second support portion each have a stick shape, and the respective axial directions are made parallel to each other, thereby making it possible to efficiently and smoothly perform the back-and-forth movements by the push-in bar.

In the extraction valve according to the present invention, the first spring body and the second spring body are attached. Thus, the first valve body pushed by the push-in bar is restored to its original position with a spring force of the first spring body, and the second valve body pushed by the push-in bar is restored to its original position with a spring force of the second spring body. This makes it possible for the extraction valve to have a simpler internal structure.

In the extraction valve according to the present invention, if the first valve body includes a first cover portion covering the first head portion, the second valve body includes a second cover portion that covers the second head portion, and the first cover portion and the second cover portion are brought into contact with the push-in bar, the first cover portion is rubbed with the push-in bar instead of the first head portion when the push-in bar rotates to push the first valve body and the second cover portion is rubbed with the push-in bar instead of the second head portion when the second valve body is pushed.

This makes it possible to prevent the first head portion and the second head portion from being rubbed to wear. The first cover portion is detachably attached to the first head portion, and the second cover portion is detachably attached to the second head portion. Accordingly, if the first cover portion or the second cover portion wears, only the cover portion may be replaced.

In the extraction valve according to the present invention, if the first beverage is an undiluted solution and flows between the spacer and the nozzle section and is extracted, and the second beverage is a foamed solution and flows between the flow rate adjuster and the pipe and is guided to the acceptor and extracted from inside the spacer, a high carbonate concentration of the foamed solution can be maintained, and the undiluted solution, the foamed solution, or the undiluted solution and the foamed solution can be selectively extracted.

BRIEF DESCRIPTION OF DRAWINGS

FIG. 1(*b*) is a rear view of the extraction valve illustrated to in FIG. 1(*a*).

FIG. 7(*b*) is a transmission perspective view of the extraction valve according to the other embodiment.

DESCRIPTION OF EMBODIMENTS

Figure 1A:
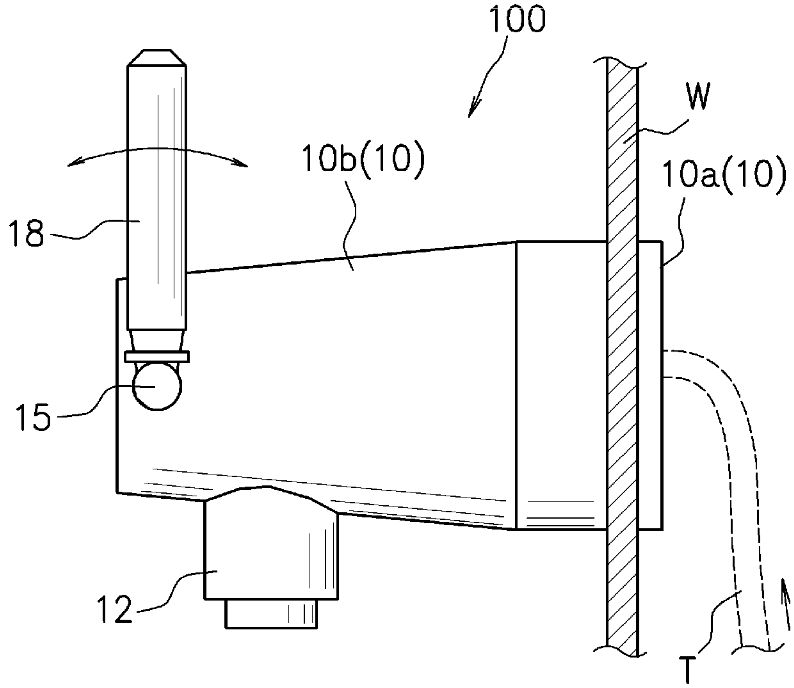
FIG. 1(*a*) is a side view illustrating an embodiment of an extraction valve according to the present invention.

A preferred embodiment of the present invention will be described in detail below with reference to the drawings, as needed. In the drawings, the same elements are respectively assigned the same reference numerals, and overlapping description is omitted. Dimensional ratios in the drawings are not limited to illustrated ratios.

In the specification, the extraction section side in a length direction of a main body section is set as "front", and the inflow port portion side in the length direction of the main body section is set as "rear". That is, "front-rear direction" means the length direction (a horizontal direction in FIG. 1) of the main body section, and "back-and-forth movement" means reciprocation in the length direction of the main body section.

"Radial direction" means a direction (a vertical direction in FIG. 1) perpendicular to the length direction of the main body section.

Figure 1B:
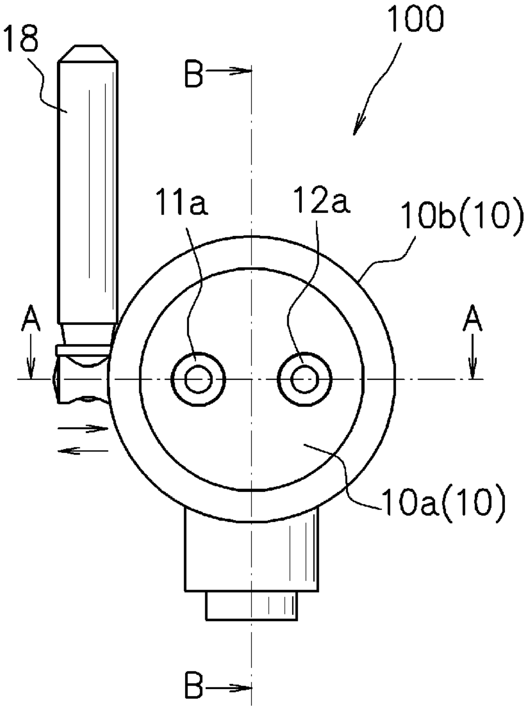

FIG. 1(*a*) is a side view illustrating an embodiment of an extraction valve according to the present invention, and FIG. 1(*b*) is a rear view of the extraction valve illustrated in FIG. 1(*a*). In FIG. 1(*b*), description of a wall section W and a tube T is omitted.

An extraction valve 100 according to the present embodiment includes a main body section 10, an extraction section 12 provided on a side surface 10*b* of the main body section, a push-in bar 15 inserted into the main body section 10, and a cock 18 connected to the push-in bar 15, as illustrated in FIG. 1(*a*), and a first inflow port portion 11*a* and a second inflow port portion 12*a* provided in a back portion 10*a* of the main body section 10, as illustrated in FIG. 1(*b*).

The extraction valve 100 has a simple internal structure in which the push-in bar 15 and a first valve body and a second valve body, described below, are attached in the main body section 10 provided with the first inflow port portion 11*a* and the second inflow port portion 12*a*. Accordingly, the extraction valve 100 has a relatively small number of components, and is significantly easy to repair and maintain.

As illustrated in FIG. 1(*a*), in the extraction valve 100, tubes T are respectively attached to the first inflow port portion 11*a* and the second inflow port portion 12*a*, and a first beverage and a second beverage are respectively allowed to flow into the first inflow port portion 11*a* and the second inflow port portion 12*a* via the tubes T.

The first beverage and the second beverage are forcibly allowed to flow into the extraction valve 100 with predetermined pressure by gas pressure, a pump, or the like. Such pressure is always maintained. Accordingly, when the valve body opens the flow path, described below, the beverage flows therethrough.

The extraction valve 100 is used with the main body section 10 attached to a wall portion W of a storage tank for containing the first beverage and the second beverage, a refrigerator for refrigerating the first beverage and the second beverage, or an inclination device for inclining a container into which the first beverage or the second beverage is injected, for example. That is, the extraction valve 100 is installed such that the beverages can respectively flow from the first inflow port portion and the second inflow port portion and a container can be arranged below the extraction section 12 because the beverages are extracted from the extraction section 12.

In the extraction valve 100, when the first beverage is allowed to flow from the first inflow port portion 11*a* and the second beverage is allowed to flow from the second inflow port portion 12*a* to incline the cock 18, only the first beverage, only the second beverage, or both the first beverage and the second beverage can be selectively extracted from the one extraction section 12 depending on a position of the cock 18. A mechanism for the extraction will be described below.

Although the first beverage and the second beverage are not particularly limited, examples of the first beverage include an undiluted solution of a general beverage. When the first beverage is an undiluted solution, examples of the second beverage include a diluted solution for the undiluted solution, such as water or a foamed solution. Among them, the undiluted solution and the foamed solution are respectively appropriately used as the first beverage and the second beverage in the extraction valve 100 according to the present embodiment, as described below.

Figure 2:
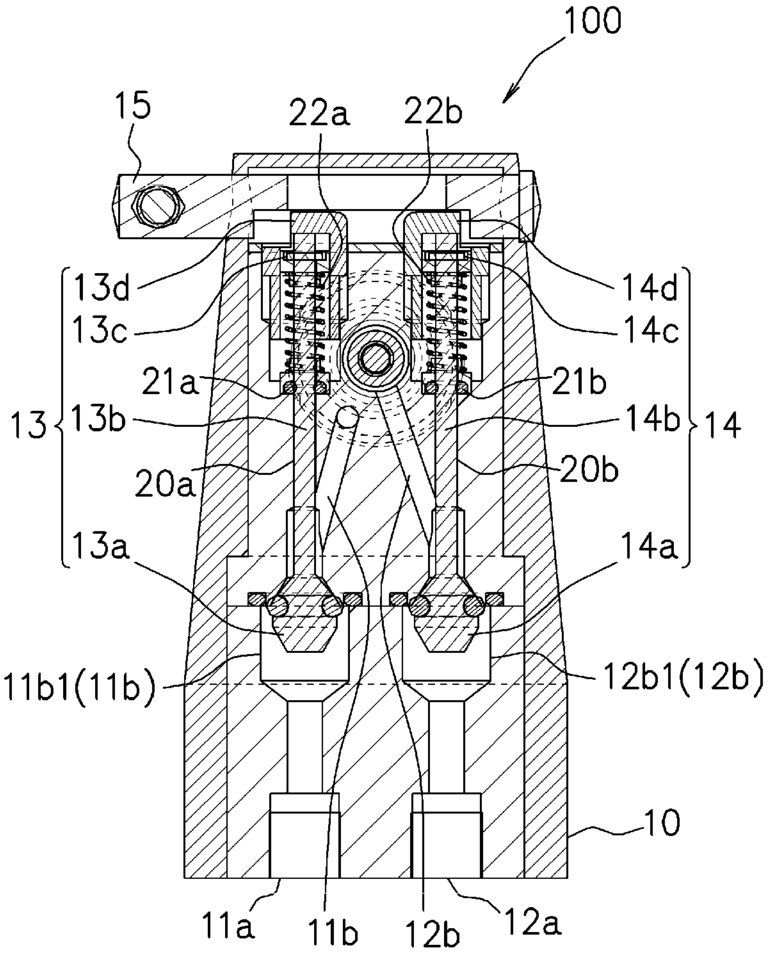
FIG. 2 is a cross-sectional view taken along a line A-A of the extraction valve illustrated in FIG. 1(*b*).
Figure 3:
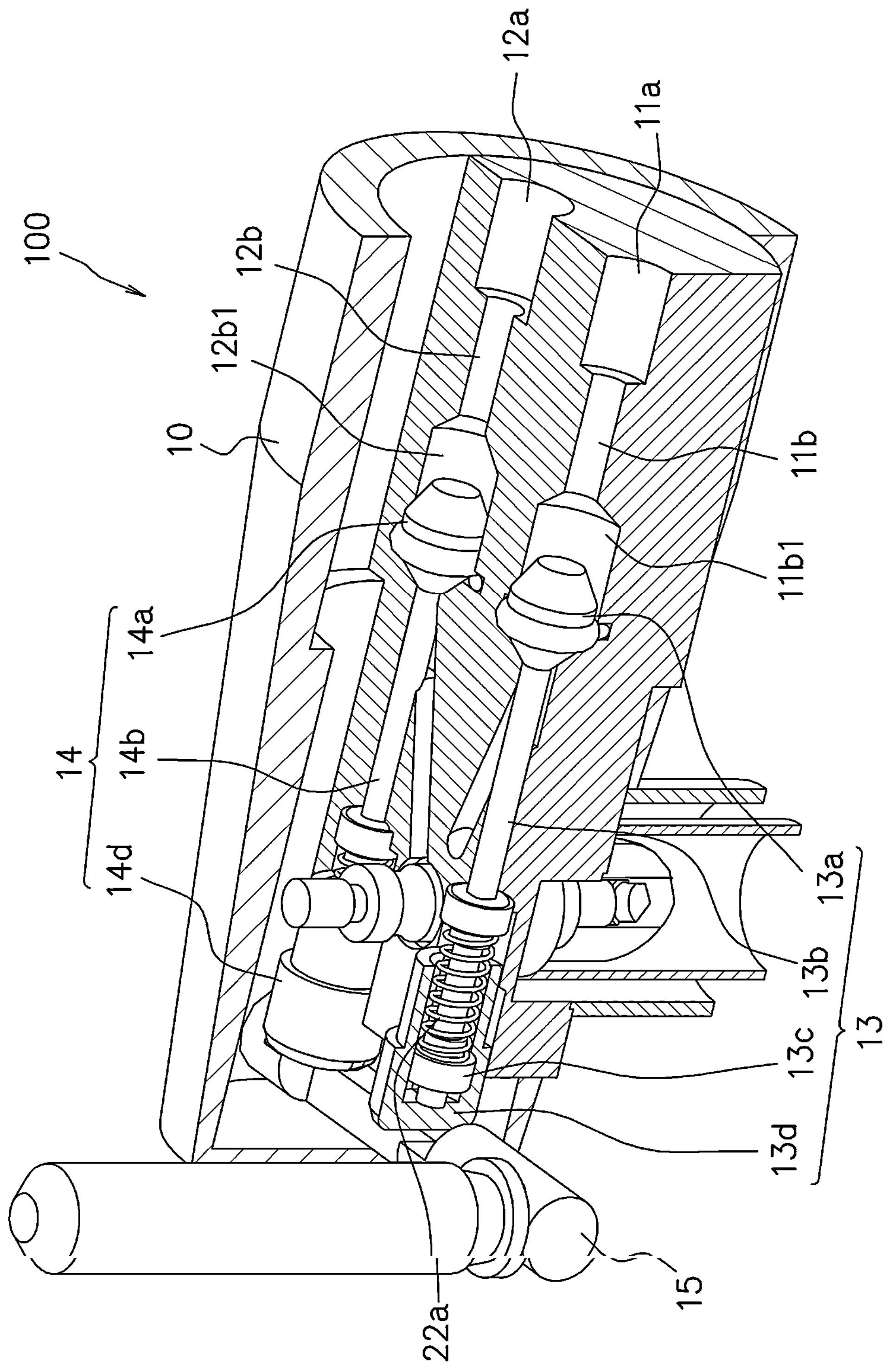
FIG. 3 is a broken perspective view of the extraction valve according to the present embodiment.

FIG. 2 is a cross-sectional view taken along a line A-A of the extraction valve illustrated in FIG. 1(*b*), and FIG. 3 is a broken perspective view of the extraction valve according to the present embodiment.

As illustrated in FIGS. 2 and 3, the main body section 10 has a cylindrical trapezoidal shape, and has a first flow path 11*b* through which the first beverage flows and a second flow path 12*b* through which the second beverage flows provided therein.

In the beverage valve 100, the first flow path 11*b* connects the first inflow port portion 11*a* and an internal flow path of the extraction section 12 to each other. The first beverage that has been allowed to flow from the first inflow port portion 11*a* flows through the first flow path 11*b* and is extracted from the extraction section 12.

The second flow path 12*b* connects the second inflow port portion 12*a* and the internal flow path of the extraction section 12 to each other. The second beverage that has been allowed to flow from the second inflow port portion 12*a* flows through the second flow path 12*b* and is extracted from the extraction section 12.

At this time, in the extraction valve 100, the first flow path 11*b* has a structure including a first large-diameter portion 11*b*1 having a larger diameter than that of the first flow path 11*b* in its middle and extending in a front-rear direction from the first inflow port portion 11*a* to the first large diameter portion 11*b*1 and extending in an oblique direction toward the internal flow path of the extraction section 12 from the first large diameter portion 11*b*1.

Similarly, the second flow path 12*b* has a structure including a second large-diameter portion 12*b*1 having a larger diameter than that of the second flow path 12*b* in its middle and extending in a front-rear direction from the second inflow port portion 12*a* to the second large diameter portion 12*b*1 and extending in an oblique direction toward the internal flow path of the extraction section 12 from the second large diameter portion 12*b*1.

In the main body section 10, a first insertion hole 20*a* communicating with the first large diameter portion 11*b*1 and a second insertion hole 20*b* communicating with the second large diameter portion 12*b*1 are respectively formed separately from the first flow path 11*b* and the second flow path 12*b*.

The first flow path 20*a* is located on the same straight line as that of the first flow path 11*b* from the first inflow port portion 11*a* to the first large diameter portion 11*b*1, described above, and the second flow path 20*b* is located on the same straight line as that of the second flow path 12*b* from the second inflow port portion 12*a* to the second large diameter portion 12*b*1, described above. Accordingly, respective back-and-forth movements of the first valve body 13 and the second valve body 14 are significantly smoothly performed.

The main body section 10 contains the first valve body 13 and the second valve body 14 that are movable back and forth.

The first valve body 13 includes a first valve portion 13*a*, a first support portion 13*b* supporting the first valve portion 13*a*, a first head portion 13*c* provided at an end of the first support portion 13*b* on the opposite side to the first valve portion 13*a*, and a first cover portion 13*d* for covering the first head portion 13*c*.

Similarly, the second valve body 14 includes a second valve portion 14*a*, a second support portion 14*b* supporting the second valve portion 14*a*, a second head portion 14*c* provided at an end of the second support portion 14*b* on the opposite side to the second valve portion 14*a*, and a second cover portion 14*d* for covering the second head portion 14*c*.

The first valve body 13 is formed by integrating the first valve portion 13*a*, the first support portion 13*b*, the first head portion 13*c*, and the first cover portion 13*d* and has a stick shape extending in a front-rear direction, and the second valve body 14 is formed by integrating the second valve portion 14*a*, the second support portion 14*b*, the second head portion 14*c*, and the second cover portion 14*d* and has a stick shape extending in a front-rear direction.

The first valve portion 13*a* is inserted into the first large diameter portion 11*b*1 in the first flow path 11*b*, and the first support portion 13*b* is inserted into the first insertion hole 20*a*.

The first valve portion 13*a* moves back and forth in the first large diameter portion 11*b*1 on the basis of the back-and-forth movement of the first vale body 13. That is, the first flow path 11*b* is closed when the first valve portion 13*a* is brought into contact with the first large diameter portion 11*b*1, and is opened when the first valve portion 13*a* deviates from the first large diameter portion 11*b*1.

Similarly, the second valve portion 14*a* is inserted into the second large diameter portion 12*b*1 in the second flow path 12*b*, and the second support portion 14*b* is inserted into the second insertion hole 20*b*.

The second valve portion 14*a* moves back and forth in the second large diameter portion 12*b*1 on the basis of the back-and-forth movement of the second vale body 14. That is, the second flow path 12*b* is closed when the second valve portion 14*a* is brought into contact with the second large diameter portion 12*b*1, and is opened when the second valve portion 14*a* deviates from the second large diameter portion 12*b*1.

Both the first support portion 13*b* and the second support portion 14*b* each have a stick shape, and their respective axial directions are parallel to each other. That is, the first insertion hole 20*a* and the second insertion hole 20*b*, described above, are formed parallel to each other. This makes it possible to efficiently and smoothly perform the back-and-forth movements by the push-in bar 15.

In the extraction valve 100, a first spring body 22*a* having a coil shape is attached to the first valve body 13. Specifically, the first support portion 13*b* is inserted into the first spring body 22*a*, and the first spring body 22*a* has its one end brought into contact with the first head portion 13*c* having a larger diameter than that of the first support portion 13*b* and its other end brought into contact with a first receiving stand 21*a* formed in the first insertion hole 20*a* in the main body section 10. That is, the first spring body 22*a* sandwiched between the first head portion 13*c* and the first receiving stand 21*a* is attached to the first valve body 13.

Similarly, a second spring body 22*b* having a coil shape is attached to the second valve body 14. Specifically, the second support portion 14*b* is inserted into the second spring body 22*b*, and the second spring body 22*b* has its one end brought into contact with the second head portion 14*c* having a larger diameter than that of the second support portion 14*b* and its other end brought into contact with a second receiving stand 21*b* formed in the second insertion hole 20*b* in the main body section 10. That is, the second spring body 22*b* sandwiched between the second head portion 14*c* and the second receiving stand 21*b* is attached to the second valve body 14.

The first spring body 22*a* does not interfere with the back-and-forth movement of the first valve body 13 except that the first head portion 13*c* is urged toward the front side (i.e., toward the push-in bar 15 side).

Similarly, the second spring body 22*b* does not interfere with the back-and-forth movement of the second valve body 14 except that the second head portion 14*c* is urged toward the front side (i.e., toward the push-in bar 15 side).

In the extraction valve 100, the first valve body 13 pushed by the push-in bar 15 is restored to its original position with a spring force of the first spring body 22*a*, and the second valve body 14 pushed by the push-in bar 15 is restored to its original position with a spring force of the second spring body 22*b*. This makes it possible to more simplify the internal structure of the extraction valve 100.

In the extraction valve 100, the first cover portion 13*d* is located at an end of the first support portion 13*b* on the opposite side to the first valve portion 13*a*, and is attached to cover the first head portion 13*c*.

Similarly, the second cover portion 14*d* is located at an end of the second support portion 14*b* on the opposite side to the second valve portion 14*a*, and is attached to cover the second head portion 14*c*.

The first cover portion 13*d* and the second cover portion 14*d* are each brought into contact with the push-in bar.

That is, in the extraction valve 100, the first valve body 13 is brought into contact with the push-in bar 15 via the first cover portion 13*d*, and the second valve body 14 is brought into contact with the push-in bar 15 via the second cover portion 14*d*.

Then, in the extraction valve 100, the first cover portion 13*d* is rubbed with the push-in bar 15 instead of the first head portion 13*c* when the push-in bar 15 rotates to push the first valve body 13, and the second cover portion 14*d* is rubbed with the push-in bar instead of the second head portion 14*c* when the second valve body 14 is pushed.

At this time, the first cover portion 13*d* is detachably attached to the first head portion 13*c*, and the second cover portion 14*d* is detachably attached to the second head portion 14*c*. Accordingly, in the extraction valve 100, even when the first cover portion 13*d* or the second cover portion 14*d* is rubbed with the push-in bar 15 to wear, only the cover portion can be easily replaced.

Referring to FIG. 1(*a*) and FIG. 1(*b*) again, the cock 18 is connected to an end of the push-in bar 15, and the push-in bar 15 is rotated in synchronization with an operation of the cock 18. That is, the push-in bar 15 rotates on the basis of inclination of the cock 18. Accordingly, the cock 18 is connected to an exposed end of the push-in bar 15, thereby preventing contaminants such as dust and droplets of a beverage from entering the main body section 10. As a result, a failure caused by the contaminants can be prevented from occurring.

The push-in bar 15 has a stick shape extending in a radial direction of the main body section 10, and is attached to the main body section by being loosely inserted thereinto.

The push-in bar 15, together with the cock 18, is slidable in an axial direction of the push-in bar 15 (in a radial direction of the main body section 10) with respect to the main body section 10 (see FIG. 1(*b*)).

Figure 4:
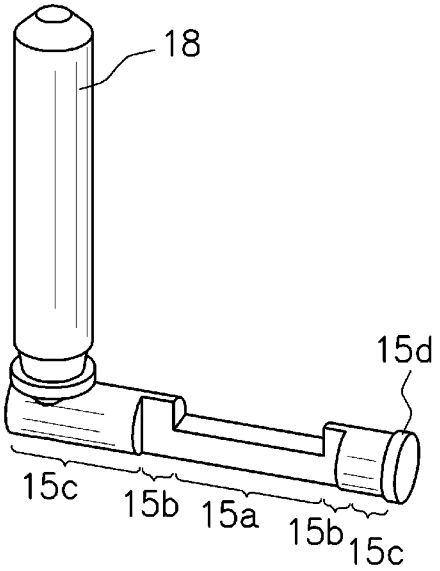
FIG. 4 is a perspective view illustrating a push-in bar and a cock in the extraction valve according to the present embodiment.

FIG. 4 is a perspective view illustrating a push-in bar and a cock in an extraction valve according to the present embodiment.

As illustrated in FIG. 4, the push-in bar 15 includes a quarter-semicylindrical portion 15*a* having a quarter-semicylindrical shape located at its center, semicylindrical portions 15*b* each having a semicylindrical shape respectively provided to be continuous to both sides of the quarter-semicylindrical portion 15*a*, and cylindrical portions 15*c* each having a cylindrical shape respectively provided to be continuous to the semicylindrical portions 15*b*. That is, the push-in bar 15 has a structure in which a part of a so-called round bar is notched and the cylindrical portion 15*c*, the semicylindrical portion 15*b*, the quarter-semicylindrical portion 15*a*, the semicylindrical portion 15*b*, and the cylindrical portion 15*c* are sequentially formed continuously.

In the push-in bar 15, the cock 18 is attached to the cylindrical portion 15*c* on one side, and a stopper 15*d* having a larger diameter than that of the cylindrical portion 15*c* is provided in the cylindrical portion 15*c* on the other side.

In the push-in bar 15, at least the semicylindrical portions 15*b* and the quarter-semicylindrical portion 15*a* are located in the main body section 10, and the cock 18 and the stopper 15*d* are exposed from the main body section 10.

Sliding in the axial direction of the push-in bar 15 is limited when the cock 18 or the stopper 15*d* is brought into contact with an outer peripheral surface of the main body section 10.

Even if the push-in bar 15 slides, the semicylindrical portions 15*b* and the quarter-semicylindrical portion 15*a* are always located in the main body section 10 by such a limitation.

The push-in bar 15 is slidable to be located at a first position, a second position, and a third position in the axial direction of the push-in bar 15. Specifically, the push-in bar 15 is movable between the first position and the second position. A position on one side is the first position, a position on the other side is the second position, and a position between the first position and the second position is the third position. This makes it possible to clearly distinguish the first position, the second position, and the third position, making it difficult for a malfunction to occur.

Figure 5:
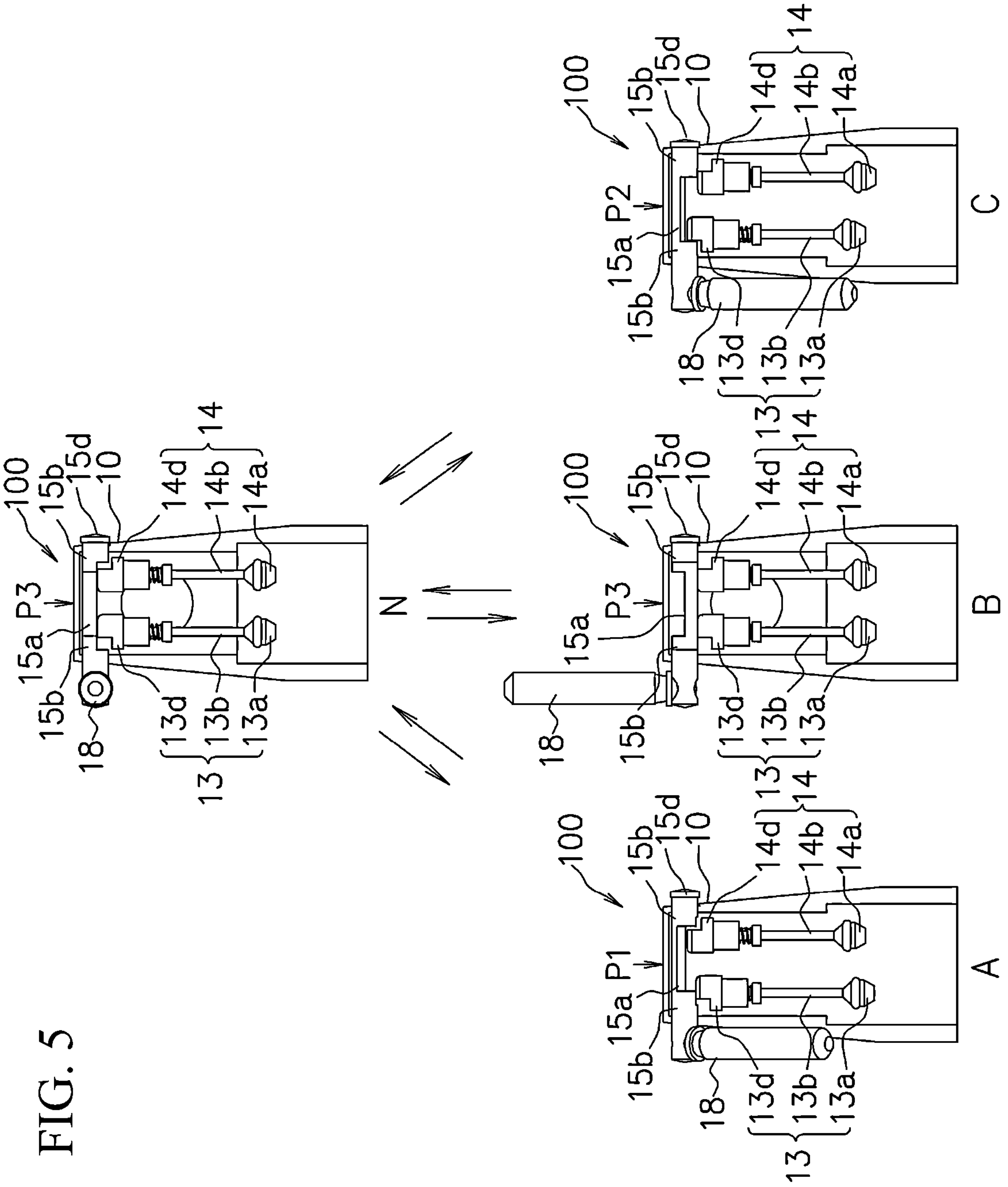
FIG. 5 is an explanatory view for describing respective movements of a valve body at positions, i.e., a first position, a second position, and a third position in the extraction valve according to the present embodiment.

FIG. 5 is an explanatory view for describing movements of a valve body at respective positions, i.e., the first position, the second position, and the third position in the extraction valve according to the present embodiment. In FIG. 5, a state of the extraction valve at a normal time (at a non-extraction time) is "N", a state of the extraction valve at the time when only the first beverage is extracted is "A", a state of the extraction valve at the time when the first beverage and the second beverage are extracted is "B", and a state of the extraction valve at the time when only the second beverage is extracted is "C" for convenience.

As illustrated in FIG. 5, when the extraction valve is in the state N, the push-in bar 15 is located at a third position P3 at a substantial center of the main body section 10.

At this time, a part of the first cover portion 13*d* is brought into contact with a plane on the notched side of the semi-cylindrical portion 15*b* in the first valve body 13, and a part of the second cover portion 14*d* is brought into contact with the plane on the notched side of the semicylindrical portion 15*b* in the second valve body 14. As a result, the first valve body 13 and the second valve body 14 are located on the front side (on the push-in bar 15 side). Thus, the first flow path is closed by the first valve portion 13*a*, and the second flow path is closed by the second valve portion 14*a*.

The extraction valve enters the state B by operating the cock 18 to rotate the push-in bar 15 from the state N. In this case, the push-in bar 15 is also located at the third position P3.

In the state B of the extraction valve, the first valve body 13 and the second valve body 14 are pushed by rotating the push-in bar 15, and the first cover portion 13*d* in the first valve body 13 and the second cover portion 14*d* in the second valve body 14 are brought into contact with a peripheral surface portion of the semicylindrical portion 15*b*. As a result, the first valve body 13 and the second valve body 14 move backward upon being respectively pushed by the semicylindrical portions 15*b*. Thus, the first flow path is opened by the first valve portion 13*a*, and the second flow path is opened by the second valve portion 14*a*.

The extraction valve is located at a first position P1 when the push-in bar 15 is slid until the cock 18 is brought into contact with the outer peripheral surface of the main body section 10 in the axial direction from the state N.

The extraction valve enters the state A when the cock 18 is operated to rotate the push-in bar 15.

In the state A of the extraction valve, the first valve body 13 is pushed by rotating the push-in bar 15, and the first cover portion 13*d* is brought into contact with the peripheral surface portion of the semicylindrical portion 15*b*. On the other hand, the second valve body 14 is not pushed by rotating the push-in bar 15 because the second cover portion 14*d* is brought into contact with a plane on the notched side of the quarter-semicylindrical portion 15*a*. As a result, the first valve body 13 is pushed by the semicylindrical portions 15*b* to move backward. Thus, the first flow path is opened by the first valve portion 13*a*. On the other hand, the second valve body 14 does not move but is located on the front side. Thus, the second flow path is closed by the second valve portion 14*a*.

The extraction valve is located at a second position P2 when the push-in bar 15 is slid until the stopper 15*d* is brought into contact with the outer peripheral surface of the main body section in the axial direction from the state N.

The extraction valve enters the state C when the cock 18 is operated to rotate the push-in bar 15.

In the state C of the extraction valve, the second valve body 14 is pushed by rotating the push-in bar 15, and the second cover portion 14*d* is brought into contact with the peripheral surface portion of the semicylindrical portion 15*b*. On the other hand, the first valve body 13 is not pushed by rotating the push-in bar 15 because the first cover portion 13*d* is brought into contact with the plane on the notched side of the quarter-semicylindrical portion 15*a*. As a result, the second valve body 14 is pushed by the semicylindrical portion 15*b* to move backward. Thus, the second flow path is opened by the second valve portion 14*a*. On the other hand, the first valve body 13 does not move but is located on the front side. Thus, the first flow path is closed by the first valve portion 13*a*.

As a result, in the extraction valve 100, if the push-in bar is located at the first position P1, only the first valve body 13 moves backward to open the first flow path when the push-in bar is rotated using the cock 18. If the push-in bar 15 is located at the second position P2, only the second valve body 14 moves backward to open the second flow path when the push-in bar 15 is rotated using the cock 18. If the push-in bar 15 is located at the third position P3, both the first valve body 13 and the second valve body 14 move backward to respectively open the first flow path and the second flow path when the push-in bar 15 is rotated using the cock 18.

Therefore, in the extraction valve 100, the valve body to be moved back and forth can be switched by a simple operation of pushing and pulling the push-in bar 15 in the axial direction to change the position (the first position P1, the second position P2, and the third position P3).

When the push-in bar 15 is rotated depending on the position of the push-in bar 15, the first beverage, the second beverage, or the first beverage and the second beverage can be selectively extracted from the one extraction section 12.

After the push-in bar 15 pushes the first valve body 13 and/or the second valve body 14, the cock 18 is returned to its original position so that the push-in bar 15 oppositely rotates, the first spring body 22*a* restores the first valve body 13 to the original position with its spring force, and the second spring body 22*b* restores the second valve body 14 to the original position with its spring force. As a result, the extraction valve 100 returns to the state N.

Accordingly, the push-in bar 15 and the first and second valve bodies 13 and 14 are in a so-called relationship between a cam and a follower.

The extraction section 12 is provided to protrude from the side surface 10*b* of the main body section 10.

Figure 6:
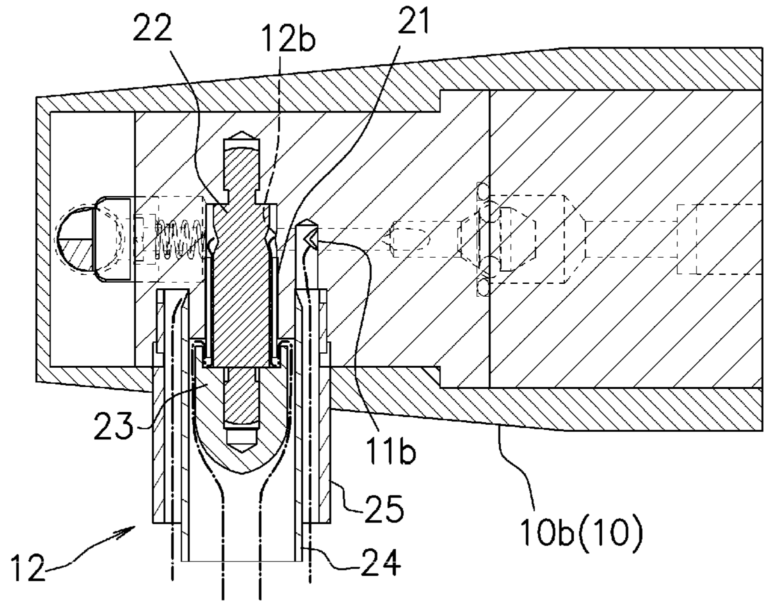
FIG. 6 is a cross-sectional view taken along a line B-B of the extraction valve illustrated in FIG. 1(*b*).

FIG. 6 is a cross-sectional view taken along a line B-B of the extraction valve illustrated in FIG. 1(*b*).

As illustrated in FIG. 6, the extraction section 12 includes a pipe section 21 having a cylindrical shape contained in the main body section 10, a flow rate adjuster 22 arranged inside the pipe section 21, an acceptor 23 attached to a lower end of the flow rate adjuster 22, a spacer 24 having a cylindrical shape attached to the main body section 10 and arranged to surround the flow rate adjuster 22 and the acceptor 23, and a nozzle section 25 having a cylindrical shape attached to the main body section 10 and arranged outside the spacer 24.

In the main body section 10, the second flow path 12*b* communicates with the pipe section 21, and the second beverage flowing through the second flow path 12*b* flows into the pipe section 21.

The second beverage flows between the pipe section 21 and the flow rate adjuster 22.

The flow rate adjuster 22 has its one end screwed into the main body section 10.

The flow rate adjuster 22 has its outer peripheral surface provided with a mesh-shaped groove.

When the second beverage is a foamed solution, the flow velocity of the foamed solution can be adjusted by adjusting a direction, a diameter, a depth, and the like of the groove. This makes it possible to maintain the carbon dioxide gas concentration of the foamed solution and solve a pressurized state by gas pressure, a pump, or the like.

A mesh-shaped groove can also be provided on an inner peripheral surface of the pipe section 21.

Then, the second beverage drops along an outer surface of the acceptor 23 having a dome shape attached to a lower end of the flow rate adjuster 22. This results in further decrease in drop velocity (flow velocity) of the second beverage and prevents the second beverage from being scattered in four directions.

Therefore, the second beverage flows between the flow rate adjuster 22 and the pipe 21 as an internal flow path of the extraction section 12 and is guided to the acceptor 23 and extracted from inside the spacer 24.

On the other hand, in the main body section 10, the first flow path 11*b* communicates with a flow path between the spacer 24 and the nozzle section 25, and the first beverage flowing through the first flow path 11*b* flows into the flow path.

The first beverage flows between the spacer 24 and the nozzle section 25 as an internal flow path of the extraction section 12 and is extracted.

Therefore, in the extraction valve 100, the first beverage and the second beverage are respectively extracted from different internal flow paths in the extraction section 12.

If the first beverage is an undiluted solution and the second beverage is a foamed solution, a high carbonate concentration of the foamed solution can be maintained, and the undiluted solution, the foamed solution, or the undiluted solution and the foamed solution can be selectively extracted.

Although a preferred embodiment of the present invention has been described above, the present invention is not limited to the above-described embodiment.

Although in the extraction valve 100 according to the present embodiment, the first flow path 11*b* has a structure including a first large-diameter portion 11*b*1 in its middle and extending in a front-rear direction from the first inflow port portion 11*a* to the first large diameter portion 11*b*1 and extending in an oblique direction toward the internal flow path of the extraction section 12 from the first large diameter portion 11*b*1, for example, the presence or absence of the first large diameter portion and the direction of the flow path are not limited to these.

The same applies to the second flow path.

Although in the extraction valve 100 according to the present embodiment, the first valve body 13 includes the first valve portion 13*a*, the first support portion 13*b*, the first head portion 13*c*, and the first cover portion 13*d*, the present invention is not limited to this if the first flow path 11*b* is openable and closable. The first valve body 13 may not include the first cover portion 13*d* so that the first head portion 13*c* is brought into direct contact with the push-in bar 15.

The same applies to the second valve body 14.

Although in the extraction valve 100 according to the present embodiment, the first spring body 22*a* is attached to the first valve body 13, and the first valve body 13 is restored to the original position with the spring force of the first spring body 22*a*, a method for the restoration is not limited to this.

For example, there may be provided a so-called crank mechanism, for example, for connecting the first valve body and the push-in bar to each other and moving the first valve body back and forth on the basis of a direction in which the push-in bar rotates.

The same applies to the second valve body 14.

Although in the extraction valve 100 according to the present embodiment, the first position, the second position, and the third position and respective movements of the valve body at the positions are described with reference to FIG. 5, the first position, the second position, and the third position are not limited to the positions illustrated in FIG. 5, but may slightly shift from one another even within ranges where their respective functions are exhibited.

Although in the extraction valve 100 according to the present embodiment, the extraction section 12 includes the pipe section 21, the flow rate adjuster 22, the acceptor 23, the spacer 24, and the nozzle section 25, the present invention is not limited to this.

In the extraction valve 100 according to the present embodiment, a rotation prevention section for limiting rotation of the push-in bar 15 may be separately provided.

Figure 7A:
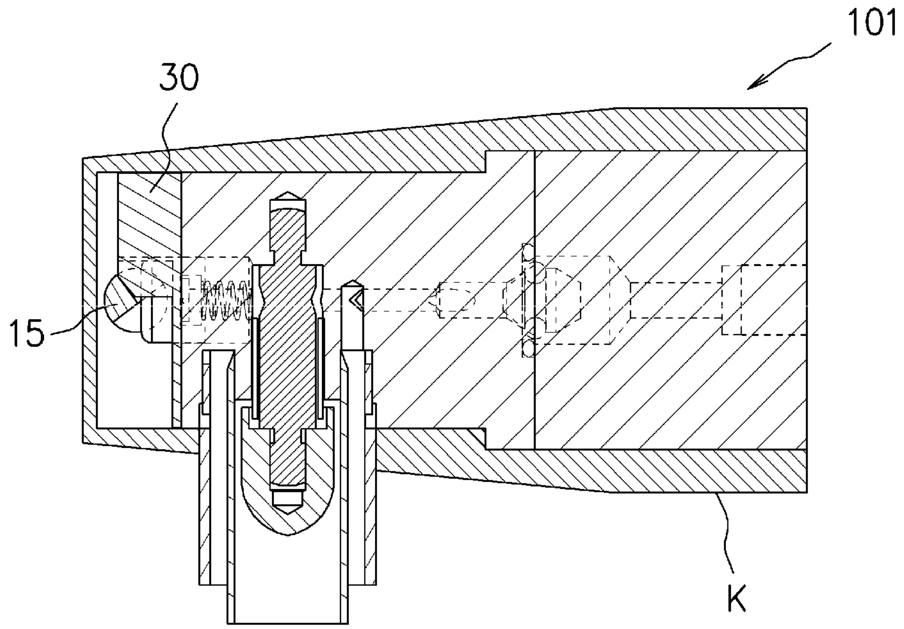
FIG. 7(*a*) is a cross-sectional view illustrating an extraction valve according to another embodiment.
Figure 7B:
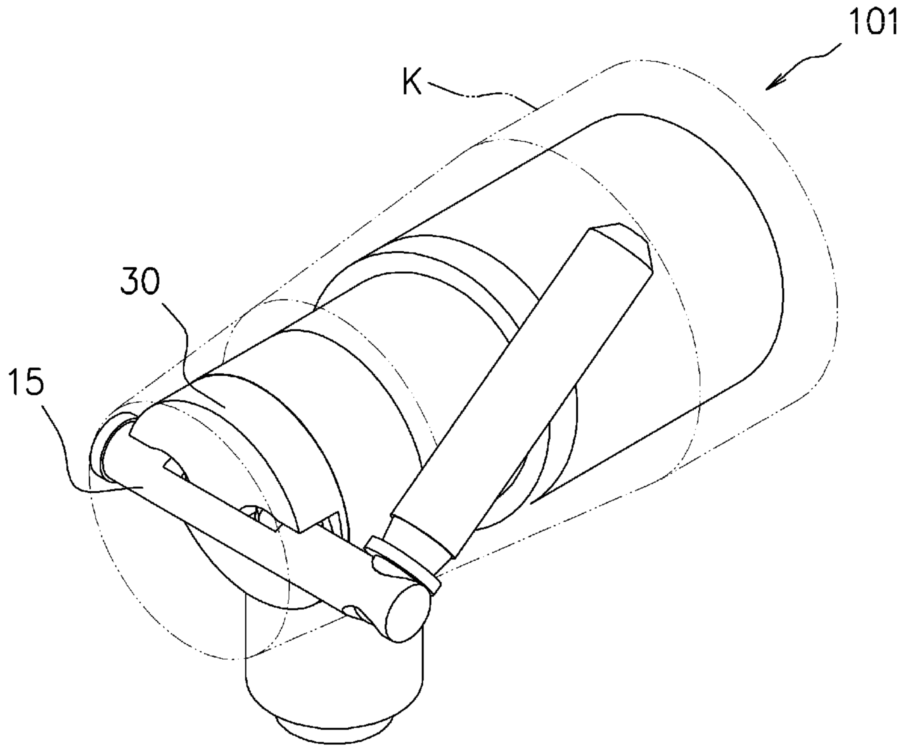

FIG. 7(*a*) is a cross-sectional view illustrating an extraction valve according to another embodiment, and FIG. 7(*b*) is a transmission perspective view of the extraction valve according to the other embodiment.

FIG. 7(*b*) is a diagram passing through a frame body K of an extraction valve 101 illustrated in FIG. 7(*a*).

As illustrated in FIGS. 7(*a*) and 7(*b*), in the extraction valve 101 according to the other embodiment, a rotation prevention section 30 for limiting rotation of a push-in bar 15 is attached.

Specifically, the rotation prevention section 30 is brought into contact with a quarter-semicylindrical portion 15*a* in the push-in bar 15 by rotating the push-in bar 15. This makes it possible to reliably prevent the push-in bar 15 from too rotating.

INDUSTRIAL APPLICABILITY

The extraction valve according to the present invention can be used as a device into which a first beverage and a second beverage are respectively allowed to independently flow and which enables the first beverage, the second beverage, and the first beverage and the second beverage to be selectively extracted from one extraction section.

The extraction valve according to the present invention can prevent entrance of contaminants and enables a first beverage, a second beverage, or the first beverage and the second beverage to be selectively extracted even with a simple internal structure.

REFERENCE SIGNS LIST

- 10 . . . main body section,
- 100 . . . extraction valve,
- 10*a* . . . back portion of main body section,
- 10*b* . . . side surface of main body section,
- 11*a* . . . first inflow port portion,
- 11*b* . . . first flow path,
- 11*b*1 . . . first large diameter portion,
- 12 . . . extraction section,
- 12*a* . . . second inflow port portion,
- 12*b* . . . second flow path,
- 12*b*1 . . . second large diameter portion,
- 13 . . . first valve body,
- 13*a* . . . first valve portion,
- 13*b* . . . first support portion,
- 13*c* . . . first head portion,

13*d* . . . first cover portion,
14 . . . second valve body,
14*a* . . . second valve portion,
14*b* . . . second support portion,
14*c* . . . second head portion,
14*d* . . . second cover portion,
15 . . . push-in bar,
15*a* . . . quarter-semicylindrical portion,
15*b* . . . semicylindrical portion,
15*c* . . . cylindrical portion,
15*d* . . . stopper,
18 . . . cock,
20*a* . . . first insertion hole,
20*b* . . . second insertion hole,
21 . . . pipe section,
21*a* . . . first receiving stand,
21*b* . . . second receiving stand,
22 . . . flow rate adjuster,
22*a* . . . first spring body,
22*b* . . . second spring body,
23 . . . acceptor,
24 . . . spacer,
25 . . . nozzle section,
30 . . . rotation prevention section,
P1 . . . first position,
P2 . . . second position,
P3 . . . third position,
T . . . tube,
W . . . wall portion, and
K . . . frame body.

The invention claimed is:

1. An extraction valve into which a first beverage and a second beverage are respectively allowed to independently flow and which enables the first beverage, the second beverage, and the first beverage and the second beverage to be selectively extracted from one extraction section, the extraction valve comprising:

a main body section having a cylindrical trapezoidal shape;

a first inflow port portion and a second inflow port portion provided in a back portion of the main body section;

the extraction section provided on a side surface of the main body section;

a first flow path provided in the main body section and connecting the first inflow port portion and the extraction section to each other;

a second flow path provided in the main body section and connecting the second inflow port portion and the extraction section to each other;

a first valve body contained in the main body section and including a first valve portion inserted into the first flow path and a first support portion supporting the first valve portion;

a second valve body contained in the main body section and including a second valve portion inserted into the second flow path and a second support portion supporting the second valve portion;

a push-in bar which is inserted into the main body section and with which the first valve body and the second valve body are brought into contact; and a cock connected to an end, which is exposed from the main body section, of the push-in bar and used to rotate the push-in bar, wherein one or both of the first valve body and the second valve body are moved back and forth on the basis of the rotation of the push-in bar, the first flow path is opened and closed by the back-and-forth movement of the first valve body and the second flow path is opened and closed by the back-and-forth movement of the second valve body, the push-in bar is slidable to be located at a first position, a second position, and a third position in an axial direction of the push-in bar, only the first valve body moves back and forth when the push-in bar is rotated using the cock if the push-in bar is located at the first position, only the second valve body moves back and forth when the push-in bar is rotated using the cock if the push-in bar is located at the second position, and both the first valve body and the second valve body move back and forth when the push-in bar is rotated using the cock if the push-in bar is located at the third position.

2. The extraction valve according to claim 1, wherein the push-in bar includes a quarter-semicylindrical portion at its center, semicylindrical portions respectively provided to be continuous to both sides of the quarter-semicylindrical portion, and cylindrical portions respectively provided to be continuous to the semicylindrical portions, an end of the first support portion on the opposite side to the first valve portion is brought into contact with the semicylindrical portion and an end of the second support portion on the opposite side to the second valve portion is brought into contact with the quarter-semicylindrical portion at the first position, an end of the first support portion on the opposite side to the first valve portion is brought into contact with the quarter-semicylindrical portion and an end of the second support portion on the opposite side to the second valve portion is brought into contact with the semicylindrical portion at the second position, and an end of the first support portion on the opposite side to the first valve portion and an end of the second support portion on the opposite side to the second valve portion are brought into contact with the semicylindrical portion at the third position.

3. The extraction valve according to claim 1, wherein the first support portion and the second support portion each have a stick shape, and their respective axial directions are parallel to each other.

4. The extraction valve according to claim 1, wherein the first valve body further includes a first head portion provided on the opposite side to the first valve portion with respect to the first support portion, the second valve body further includes a second head portion provided on the opposite side to the second valve portion with respect to the second support portion, a first spring body sandwiched between the first head portion and a first receiving stand formed in the main body section is attached to the first valve body, and a second spring body sandwiched between the second head portion and a second receiving stand formed in the main body section is attached to the second valve body.

5. The extraction valve according to claim 1, wherein the first valve body further includes a first head portion provided on the opposite side to the first valve portion with respect to the first support portion and a first cover portion covering the first head portion, the second valve body further includes a second head portion provided on the opposite side to the second valve portion with respect to the second support portion and a second cover portion covering the second head portion, the first cover portion is detachably attached to the first head portion, the second cover portion is detachably attached to the second head portion, and the first cover portion and the second cover portion are brought into contact with the push-in bar.

6. The extraction valve according to claim 1, wherein the first beverage is an undiluted solution, and the second beverage is a foamed solution, the extraction section includes a pipe section having a cylindrical shape contained in the main body section, a flow rate adjuster arranged inside the pipe section, an acceptor attached to a lower end of the flow rate adjuster, a spacer having a cylindrical shape attached to the main body section and arranged to surround the flow rate adjuster and the acceptor, and a nozzle section having a cylindrical shape attached to the main body section and arranged outside the spacer, the first beverage flows between the spacer and the nozzle section and is extracted, and the second beverage flows between the flow rate adjuster and the pipe section and is guided to the acceptor and extracted from inside the spacer.

7. The extraction valve according to claim 2, wherein the first support portion and the second support portion each have a stick shape, and their respective axial directions are parallel to each other.

8. The extraction valve according to claim 2, wherein the first valve body further includes a first head portion provided on the opposite side to the first valve portion with respect to the first support portion, the second valve body further includes a second head portion provided on the opposite side to the second valve portion with respect to the second support portion, a first spring body sandwiched between the first head portion and a first receiving stand formed in the main body section is attached to the first valve body, and a second spring body sandwiched between the second head portion and a second receiving stand formed in the main body section is attached to the second valve body.

9. The extraction valve according to claim 2, wherein the first valve body further includes a first head portion provided on the opposite side to the first valve portion with respect to the first support portion and a first cover portion covering the first head portion, the second valve body further includes a second head portion provided on the opposite side to the second valve portion with respect to the second support portion and a second cover portion covering the second head portion, the first cover portion is detachably attached to the first head portion, the second cover portion is detachably attached to the second head portion, and the first cover portion and the second cover portion are brought into contact with the push-in bar.

10. The extraction valve according to claim 2, wherein the first beverage is an undiluted solution, and the second beverage is a foamed solution, the extraction section includes a pipe section having a cylindrical shape contained in the main body section, a flow rate adjuster arranged inside the pipe section, an acceptor attached to a lower end of the flow rate adjuster, a spacer having a cylindrical shape attached to the main body section and arranged to surround the flow rate adjuster and the acceptor, and a nozzle section having a cylindrical shape attached to the main body section and arranged outside the spacer, the first beverage flows between the spacer and the nozzle section and is extracted, and the second beverage flows between the flow rate adjuster and the pipe section and is guided to the acceptor and extracted from inside the spacer.

11. An extraction valve into which a first beverage and a second beverage are respectively allowed to independently flow and which enables the first beverage, the second beverage, and the first beverage and the second beverage to be selectively extracted from one extraction section, the extraction valve comprising:

a main body section having a cylindrical trapezoidal shape;

a first inflow port portion and a second inflow port portion provided in a back portion of the main body section;

the extraction section provided on a side surface of the main body section;

a first flow path provided in the main body section and connecting the first inflow port portion and the extraction section to each other;

a second flow path provided in the main body section and connecting the second inflow port portion and the extraction section to each other;

a first valve body contained in the main body section and including a first valve portion inserted into the first flow path and a first support portion supporting the first valve portion;

a second valve body contained in the main body section and including a second valve portion inserted into the second flow path and a second support portion supporting the second valve portion;

a push-in bar which is inserted into the main body section and with which the first valve body and the second valve body are brought into contact; and a cock connected to an end, which is exposed from the main body section, of the push-in bar and used to rotate the push-in bar, wherein one or both of the first valve body and the second valve body are moved back and forth on the basis of the rotation of the push-in bar, the first flow path is opened and closed by the back-and-forth movement of the first valve body and the second flow path is opened and closed by the back-and-forth movement of the second valve body, the push-in bar is slidable to be located at a first position, a second position, and a third position in an axial direction of the push-in bar, only the first valve body moves back and forth when the push-in bar is rotated using the cock if the push-in bar is located at the first position, only the second valve body moves back and forth when the push-in bar is rotated using the cock if the push-in bar is located at the second position, both the first valve body and the second valve body move back and forth when the push-in bar is rotated using the cock if the push-in bar is located at the third position, the push-in bar is movable between the first position and the second position, and a position on one side is the first position, a position on the other side is the second position, and a position between the first position and the second position is the third position.

12. The extraction valve according to claim 11, wherein the first support portion and the second support portion each have a stick shape, and their respective axial directions are parallel to each other.

13. The extraction valve according to claim 11, wherein the first valve body further includes a first head portion provided on the opposite side to the first valve portion with respect to the first support portion, the second valve body further includes a second head portion provided on the opposite side to the second valve portion with respect to the second support portion, a first spring body sandwiched between the first head portion and a first receiving stand formed in the main body section is attached to the first valve body, and a second spring body sandwiched between the second head portion and a second receiving stand formed in the main body section is attached to the second valve body.

14. The extraction valve according to claim 11, wherein the first valve body further includes a first head portion provided on the opposite side to the first valve portion with respect to the first support portion and a first cover portion covering the first head portion, the second valve body further includes a second head portion provided on the opposite side to the second valve portion with respect to the second support portion and a second cover portion covering the second head portion, the first cover portion is detachably attached to the first head portion, the second cover portion is detachably attached to the second head portion, and the first cover portion and the second cover portion are brought into contact with the push-in bar.

15. The extraction valve according to claim 11, wherein the first beverage is an undiluted solution, and the second beverage is a foamed solution, the extraction section includes a pipe section having a cylindrical shape contained in the main body section, a flow rate adjuster arranged inside the pipe section, an acceptor attached to a lower end of the flow rate adjuster, a spacer having a cylindrical shape attached to the main body section and arranged to surround the flow rate adjuster and the acceptor, and a nozzle section having a cylindrical shape attached to the main body section and arranged outside the spacer, the first beverage flows between the spacer and the nozzle section and is extracted, and the second beverage flows between the flow rate adjuster and the pipe section and is guided to the acceptor and extracted from inside the spacer.

* * * * *